(12) United States Patent
Vilaro et al.

(10) Patent No.: US 9,027,632 B2
(45) Date of Patent: May 12, 2015

(54) METHOD FOR PRODUCING A METAL PART FOR AN AIRCRAFT TURBO-ENGINE

(71) Applicant: SNECMA, Paris (FR)

(72) Inventors: Thomas Vilaro, Melun (FR); Sebastien Rix, Sevres (FR); Cyrille Baudimont, Mennecy (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/354,182

(22) PCT Filed: Oct. 24, 2012

(86) PCT No.: PCT/FR2012/052436
§ 371 (c)(1),
(2) Date: Apr. 25, 2014

(87) PCT Pub. No.: WO2013/060981
PCT Pub. Date: May 2, 2013

(65) Prior Publication Data
US 2014/0262124 A1    Sep. 18, 2014

(30) Foreign Application Priority Data
Oct. 26, 2011   (FR) ...................................... 11 59733

(51) Int. Cl.
*B22D 27/02*      (2006.01)
*B22D 19/00*      (2006.01)
(Continued)

(52) U.S. Cl.
CPC ................ *B22D 23/06* (2013.01); *B22D 19/00* (2013.01); *B22F 3/1055* (2013.01); *B22F 5/009* (2013.01);
(Continued)

(58) Field of Classification Search
CPC .......... B22D 23/06; B22D 25/02; B23P 15/02

USPC .............. 164/48, 492, 494, 496, 91; 419/5, 8
See application file for complete search history.

(56) References Cited

U.S. PATENT DOCUMENTS

| 2004/0140078 A1 | 7/2004 | Liu et al. |
| 2010/0304064 A1 | 12/2010 | Huttner |
| 2011/0042031 A1 | 2/2011 | Furlong et al. |

FOREIGN PATENT DOCUMENTS

| DE | 19537264 | 4/1997 |
| DE | 202007004683 | 8/2007 |

(Continued)

OTHER PUBLICATIONS

International Search Report as issued for International Application No. PCT/FR2012/052436, dated Jun. 11, 2013.

*Primary Examiner* — Kevin P Kerns
*Assistant Examiner* — Steven Ha
(74) *Attorney, Agent, or Firm* — Pillsbury Winthrop Shaw Pittman LLP

(57) ABSTRACT

A method for producing a metal part, the part including, in particular, a first set of elements having a small thickness, and a second set of elements having a large thickness, the method including: forming a peripheral portion of the elements of the second set of elements by selectively melting a powder by scanning the surface of the powder layer with a laser beam or with an electron beam; using the peripheral portion of the elements of the second set of elements as a mould by carrying out an operation of filling an inner area defined by the peripheral portion with liquid metal; cooling the metal part to solidify the inner area defined by the peripheral portion and filled with metal.

9 Claims, 1 Drawing Sheet

(51) Int. Cl.
*B22D 23/06* (2006.01)
*B22F 3/105* (2006.01)
*B22F 5/00* (2006.01)
*B22F 5/04* (2006.01)
*B22F 7/08* (2006.01)
*B22D 19/04* (2006.01)
*C22C 19/05* (2006.01)
*B22D 25/02* (2006.01)
*B23P 15/02* (2006.01)

(52) U.S. Cl.
CPC ... *B22F 5/04* (2013.01); *B22F 7/08* (2013.01); *B22D 19/04* (2013.01); *C22C 19/056* (2013.01); *B22D 25/02* (2013.01); *B23P 15/02* (2013.01)

(56) References Cited

FOREIGN PATENT DOCUMENTS

| | | |
|---|---|---|
| DE | 102007039035 | 1/2009 |
| JP | 2005-171299 | 6/2005 |

METHOD FOR PRODUCING A METAL PART FOR AN AIRCRAFT TURBO-ENGINE

CROSS REFERENCE TO RELATED APPLICATIONS

This application is the U.S. National Stage of PCT/FR2012/052436, filed Oct. 24, 2012, which in turn claims priority to French Patent Application No. 1159733 filed Oct. 26, 2011, the entire contents of all applications are incorporated herein by reference in their entireties.

TECHNICAL FIELD OF THE INVENTION

The present invention relates to a method for producing a metal part used in an aircraft turbo-engine. Without being limiting, the metal part considered is advantageously for example a turbo-engine high pressure turbine, or a low pressure turbine; but the method according to the invention can apply to any metal part having thin portions, with a thickness not exceeding several millimeters, associated with thicker portions, having a thickness of several centimeters.

The technical field of the invention is thus, generally speaking, that of aircraft engines and, more particularly, that of the production of metal parts forming said engines.

TECHNOLOGICAL BACKGROUND OF THE INVENTION

A particular method is today favoured for producing certain metal parts for aircraft turbo-engines; it resides in a method of selectively melting a powder using a directed beam, of laser beam or electron beam type. Such a method is known under the names of Direct Metal Laser Sintering, Selective Laser Melting or Electron Beam Melting.

Such a method consists in producing a metal part by melting successive layers of powder using a laser beam or using an electron beam commanded by an information processing system in which has been recorded the three-dimensional coordinates of the points of the successive layers to be formed. In a practical manner, in a vessel, the bottom of which is formed by a translationally moveable plate, is arranged a first powder layer by means of a scraper or a roller. The layer then has a lower surface corresponding to the surface of the plate and an upper surface on which is directed and moved the laser beam or the electron beam. The energy supplied by said beam causes local melting of the powder which, on solidifying, forms a first layer of the metal part. After formation of this first layer, the plate is lowered by a distance corresponding to the thickness of a layer, then a second powder layer is brought by the scraper onto the preceding layer. In the same manner as previously, a second layer of the metal part is formed by means of the beam.

These operations are repeated up to the complete production of the part.

Such a production method makes it possible to significantly shorten the times and the costs of developing metal parts thereby produced.

However, for metal parts having portions of relatively large thickness, such a production method remains slow: in fact, each of the different successive layers has a thickness comprised between twenty and one hundred micrometers, and the number of passages of the energy source of laser beam or electron beam type is thus high.

The production time of certain parts, for example the sections of high pressure and/or low pressure turbines, is thus dependent on parameters such as the scanning speed of the beam, its power, the thickness of each of the superimposed layers, the coverage rate of the passages of the laser . . . . This production time may attain eighty-five hours.

Furthermore, a liquid bath forms during the interaction between the laser or electron beam and the bed of powder; said liquid bath is, during the production process, relatively agitated, and it is frequent that particles or ejections are ejected from said liquid bath. Said particles or ejections then fall back onto the surface that has to undergo the following passage of the beam, which can be the source of production defects, defects capable of directly impacting the mechanical strength of the part. Such ejections are favoured by an important number of passages of beam over a same area.

In order to try to provide a solution to the problems that have been mentioned, different solutions have been proposed in the prior art.

A first solution resides in the production of metal parts by machining from a block of material; but within the framework of the development of these parts, during which their geometry is capable of being frequently modified, such a solution is not suitable; it would then in fact be necessary to adapt, for each of the considered parts, in particular the machining cycle and the tools for positioning the part.

A second solution consists in producing the part by founding. Such a solution may prove to be interesting uniquely for parts produced in large numbers, because the mould to use is very costly. Such a solution is absolutely not viable within the context of the development of a turbo-engine during which the geometry of the considered parts may constantly evolve.

GENERAL DESCRIPTION OF THE INVENTION

The subject matter of the invention offers a solution to the problems that have been set out, by proposing a method for producing metal parts partially involving a technique of selective melting by laser beam or by electron beam, while limiting the use of this technique in order to be free of the main defects that it was capable of having, in particular a very slow production of the part, and the risk of appearance of mechanical defects on the produced part due to the presence of ejections during the passage of the beam on the powder. Furthermore, the method according to the invention is inexpensive to implement, including for parts for which the geometry during a development process is capable of evolving relatively frequently.

The invention thus essentially relates to a method for producing a metal part, said part comprising a first set of elements having a small thickness, typically comprised between 0.3 millimeters and 4 millimeters, and a second set of elements having a large thickness, typically greater than four millimeters, the metal part being a part of an aircraft turbo-engine, characterised in that said method comprises the various steps consisting of:

forming a peripheral portion of the elements of the second set of elements by selectively melting a metal powder by scanning the surface of the powder layer with a laser beam or with an electron beam;

using the peripheral portion of the elements of the second set of elements as a mould by carrying out an operation of filling an inner area defined by said peripheral portion with liquid metal;

cooling the metal part to solidify the inner area defined by the peripheral portion and filled with metal.

Apart from the main characteristics that have been mentioned in the preceding paragraph, the method according to the invention may have one or more complementary characteristics among the following, considered individually or according to technically possible combinations thereof;

the method comprises the additional step consisting of forming the elements of the first set of elements by selectively melting a powder by scanning the surface of the powder layer with the laser beam or with the electron beam;

the step consisting of forming the peripheral portion of the elements of the second set of elements and the step consisting of forming the elements of the first set of elements are carried out before the operation of filling the inner area defined by the peripheral portion of the elements of the second set of elements;

the peripheral portion of the elements of the second set of elements formed by selectively melting powder defines an open volume;

the peripheral portion of the elements of the second set of elements formed by selectively melting powder defines a closed volume having at least one orifice;

the method comprises the additional step consisting of, prior to the operation of filling the inner area defined by the peripheral portion of the elements of the second set of elements, removing the powder not used during the step of formation of the peripheral portion of the elements of the second set of elements by selectively melting said powder;

the elements of the second set of elements are platforms of a compressor turbine of a turbomachine for an aircraft, and the elements of the first set of elements are blades forming blend radii between said platforms.

The invention and its different applications will be better understood on reading the description that follows and by examining the accompanying figures.

BRIEF DESCRIPTION OF THE DRAWINGS

The figures are only given by way of indication and in no way limit the invention.

The figures show.

DETAILED DESCRIPTION OF AT LEAST ONE EMBODIMENT OF THE INVENTION

Figure 1:
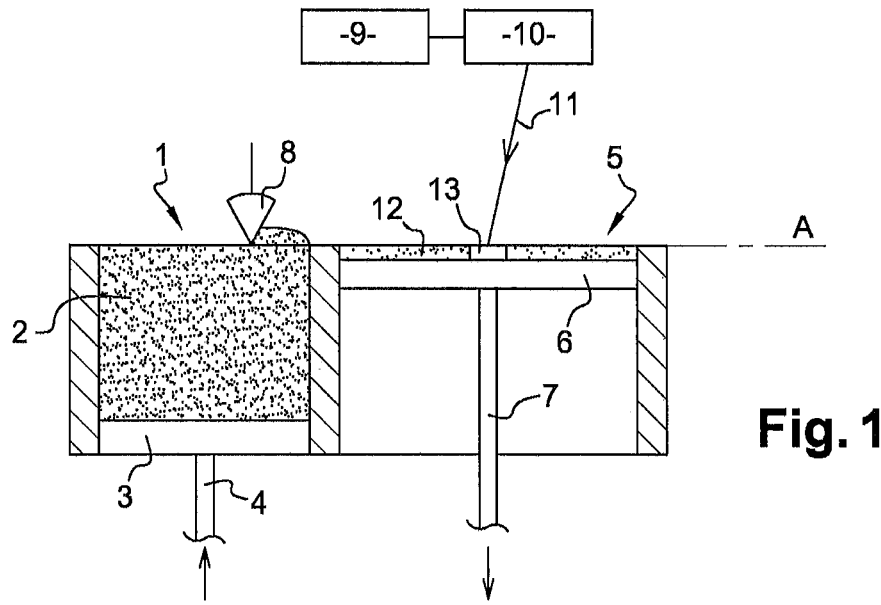
in FIG. 1, a schematic view of an installation making it possible to carry out an operation of selective melting of powder.

An installation for producing a metal part by selectively melting a powder is represented in FIG. 1. Such an installation is advantageously used for the implementation of the method according to the invention, for the production of elements of small thickness present in the considered part.

The installation represented comprises a reservoir 1 containing a metal powder 2 and the bottom 3 of which is mobile and moveable in translation by a rod 4 of a jack, and a neighbouring vessel 5, the bottom of which is constituted of a moveable plate 6, also translationally moveable by a rod 7 of a jack. The installation further comprises a scraper 8 making it possible to bring the powder of the reservoir 1 to the vessel 5, by movement along a horizontal plane A, and means 9 of generating a laser beam or an electron beam, coupled to a device 10 making it possible to direct and to move the beam 11.

The steps of producing a metal part by means of this installation are the following. Firstly, the bottom 3 of the reservoir 1 is moved 5 upwards so that a certain quantity of powder 2 is situated above the horizontal plane A. The scraper 8 is then moved from the left to the right, so as to scrape said powder layer 2 from the reservoir 1 and bring it into the vessel 5. The quantity of powder 2 and the position of the plate 6 are determined so as to form a layer 12 of powder of a chosen and constant thickness. A laser beam or an electron beam 11 then scans a determined area of the layer 12 formed in the vessel 5, so as to melt locally the powder 2, in the scanned area. The melted areas solidify so as to form a first layer 13 of the part to produce, this layer 13 having for example a thickness of 20 to 100 μm (micrometers). The plate 6 is then lowered, then a second powder layer 2 is brought, in the same manner as previously, onto the first powder layer. By controlled movement of the beam 11, a second layer of the metal part is formed on the first layer 13.

These operations are repeated up to the complete production of the part. In the case where the part is constructed layer by layer by selectively melting the powder 2 by means of a laser beam, the powder 2 has an average particle size comprised between 10 and 50 μm. In the case where the part is constructed layer by layer by selectively melting the powder 2 by means of an electron beam, the powder 2 has an average particle size comprised between 50 and 100 μm.

Figure 2:
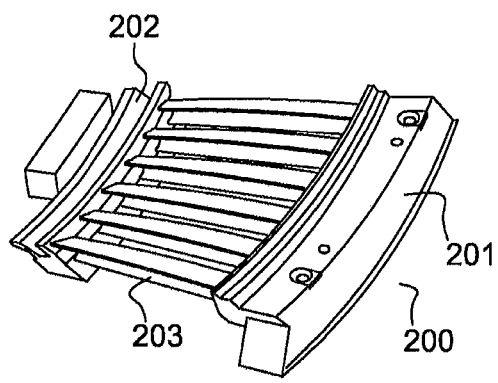
in FIG. 2, an example of metal part that can be produced by the implementation of the method according to the invention.

FIG. 2 shows an example of metal part 200 that can be produced by the implementation of the method according to the invention.

The metal part 200 is in the example represented a portion of a low pressure turbine of an aircraft turbo-engine. The method according to the invention is nevertheless capable of applying to any metal part having elements of small thickness and elements of large thickness.

Generally speaking, the expression "part of small thickness" designates a part having a thickness of several hundreds of micrometers, typically comprised between 0.3 and 4 millimeters. The large thickness elements are then elements having a thickness greater than 4 millimeters.

The metal part 200 thus has a first collar 201, known as outer collar, and a second collar 202, known as inner collar, the first collar 201 and the second collar 202 forming platforms connected together by blades 203 forming blend radii between the platforms.

Figure 3:
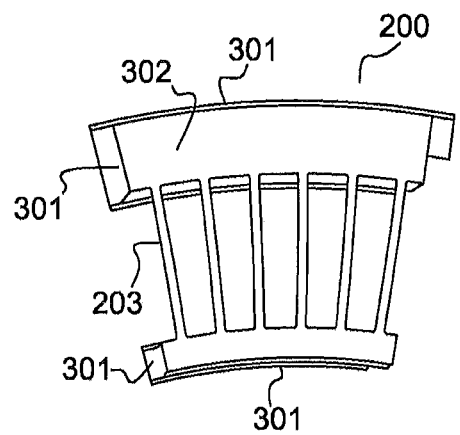
in FIG. 3, a representation of the metal part of FIG. 2 in a first step of production by the method according to the invention.
Figure 4:
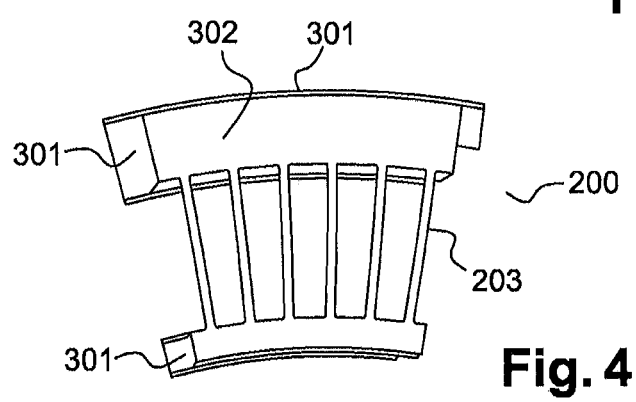
in FIG. 4, a representation of the metal part of FIG. 2 in a second step of production by the method according to the invention.

In the method according to the invention, it is proposed to produce by selective melting, for example according to the method described in FIG. 1, on the one hand the not very thick portions of the metal part 200—here the blades 203—and on the other hand a peripheral portion 301, visible in FIGS. 3 and 4, designated skin, of thicker portions—here the collars 201 and 202.

The part is thus produced in its entirety, by successive passages of a laser beam or of an electron beam, but these passages are only carried out at the places forming the skin 301; the volume inside the skin thereby created is filled with powder not transformed by the passage of the beam.

The skin 301 then has a thickness of several millimeters, typically 2 to 4 millimeters on the contour of the thick portions of the part. FIGS. 3 and 4 show different steps of the production of the skin 301, which is carried out simultaneously with the production of the blades 203 according to the method illustrated in FIG. 1.

Once the skin completed, an operation of emptying the powder not solidified by the passage of the beam is carried out. This operation is carried out by removing the powder by a face of each collar not closed by a solidified portion following the passage of the beam, or then via openings left present in the case where the skin 301 forms a closed volume.

Then follows a step of filling an interior volume 302 left empty, defined by the skin. The filling is carried out using metal heated to a sufficient temperature so that it is either in liquid form, or via an unclosed face of each collar, or via the openings left present in the case where the skin 301 forms a closed volume. The skin 301 then serves as mould, or retention tank. It is completed until the interior volume 302 is completely filled. The skin 301 will form an integral portion of the final part 200.

The part 200 is then cooled, for example by leaving it to rest at room temperature; the liquid metal then solidifies, to form a compact set.

The method according to the invention makes it possible to use the advantages of the technique of selective melting by laser or by electron beam (with a great flexibility of use and the non-necessity of specific tooling), and the advantages of founding (with a rapidity of solidification, a facility of filling and a low production cost) while not being confronted with the drawbacks of these two techniques, namely, for the technique of selective melting, a too high scanning time for massive thick sections and the risk of creating defects due to ejections from the liquid bath, and for founding, the necessity of producing a mould for each configuration and geometry of metal part.

Production times and costs are thereby reduced.

In an embodiment example, the materials used for this type of parts are generally nickel based superalloys, such as René 77, IN100, DS200 or AM1.

The invention claimed is:

1. Method for producing a metal part, said part comprising a first set of elements having a small thickness comprised between 0.3 millimeters and 4 millimeters, and a second set of elements having a large thickness greater than four millimeters, the metal part being a part of an aircraft turbo-engine, said method comprising:
    forming a peripheral portion of the elements of the second set of elements by selectively melting a metal powder by scanning a surface of a powder layer with a laser beam or with an electron beam;
    using the peripheral portion of the elements of the second set of elements as a mould by carrying out an operation of filling an inner area defined by said peripheral portion with liquid metal;
    cooling the metal part to solidify the inner area, defined by the peripheral portion and filled with metal.

2. Method according to claim 1, comprising forming the elements of the first set of elements by selectively melting a powder by scanning the surface of the powder layer with the laser beam or with the electron beam.

3. Method according to claim 2, wherein forming the peripheral portion of the elements of the second set of elements and forming the elements of the first set of elements are carried out before the operation of filling the inner area defined by the peripheral portion of the elements of the second set of elements.

4. Method according to claim 1, wherein the peripheral portion of the elements of the second set of elements formed by selectively melting powder defines an open volume.

5. Method according to claim 1, wherein the peripheral portion of the elements of the second set of elements formed by selectively melting powder defines a closed volume having at least one orifice.

6. Method according to claim 1, comprising, prior to the operation of filling the inner area defined by the peripheral portion of the elements of the second set of elements, removing the powder not used during the formation of the peripheral portion of the elements of the second set of elements.

7. Method according to claim 1, wherein the elements of the second set of elements are platforms of a turbomachine compressor turbine for an aircraft and wherein the elements of the first set of elements are blades forming blend radii between said platforms.

8. Method for producing a metal part, said part comprising a first set of elements having a first thickness and a second set of elements having a second thickness that is larger than the first thickness, the metal part being a part of an aircraft turbo-engine, said method comprising:
    forming a peripheral portion of the elements of the second set of elements by selectively melting a metal powder by scanning a surface of a powder layer with a laser beam or with an electron beam;
    using the peripheral portion of the elements of the second set of elements as a mould by carrying out an operation of filling an inner area defined by said peripheral portion with liquid metal;
    cooling the metal part to solidify the inner area, defined by the peripheral portion and filled with metal.

9. Method according to claim 8, wherein the first thickness is between 0.3 millimeters and 4 millimeters and the second thickness is greater than four millimeters.

\* \* \* \* \*